United States Patent
Lenkenhoff et al.

(10) Patent No.: US 8,950,794 B2
(45) Date of Patent: Feb. 10, 2015

(54) VEHICLE BUMPER ASSEMBLY

(75) Inventors: Christian Lenkenhoff, Schwelm (DE); Marco Töller, Köln (DE); Markus Löcker, Finnentrop (DE)

(73) Assignee: Kirchhoff Automotive Deutschland GmbH, Attendorn (DE)

( * ) Notice: Subject to any disclaimer, the term of this patent is extended or adjusted under 35 U.S.C. 154(b) by 0 days.

(21) Appl. No.: 14/006,007

(22) PCT Filed: Aug. 1, 2012

(86) PCT No.: PCT/EP2012/064980
§ 371 (c)(1),
(2), (4) Date: Sep. 18, 2013

(87) PCT Pub. No.: WO2013/023905
PCT Pub. Date: Feb. 21, 2013

(65) Prior Publication Data
US 2014/0015266 A1 Jan. 16, 2014

(30) Foreign Application Priority Data
Aug. 17, 2011 (DE) .......................... 10 2011 052 770
Aug. 17, 2011 (DE) ...................... 20 2011 051 008 U

(51) Int. Cl.
*B60R 19/34* (2006.01)
(52) U.S. Cl.
CPC ....................................... *B60R 19/34* (2013.01)
USPC ........................................................ 293/133
(58) Field of Classification Search
CPC ..... B60R 19/18; B60R 2019/186; F16F 7/12; B60J 5/0441; B60J 5/0444; B60J 5/0461
USPC ................. 293/133, 146; 296/187.09, 187.03
See application file for complete search history.

(56) References Cited

U.S. PATENT DOCUMENTS 7,762,595 B2 * 7/2010 Enderich et al. .............. 293/133
2010/0127520 A1 * 5/2010 Ginja et al. ................... 293/146

FOREIGN PATENT DOCUMENTS

DE 19635285 A1 3/1997
DE 19809112 9/1998
(Continued)

OTHER PUBLICATIONS

International Search Report for PCT/EP2012/064980—see entire document.
(Continued)

*Primary Examiner* — Joseph D Pape
*Assistant Examiner* — Dana Ivey
(74) *Attorney, Agent, or Firm* — Margaret Polson; Polson & Associates, PC

(57) ABSTRACT

The invention relates to a vehicle bumper assembly (1) having a bumper cross-member (2) and at least two energy-absorption components (3), which are arranged at a distance from one another and which are connected to the rear side of the bumper cross-member (2) and supported thereon by means of a first end. The energy-absorption components have an x-direction absorption effective direction oriented perpendicular to the y-axes longitudinal extension of the bumper. The energy-absorption components (3) are designed to be supported on a chassis part (4) of a vehicle by means of the end of the energy-absorption components pointing away from the bumper cross-member, wherein the energy-absorption component (3) has a slanted end face (5) in the direction toward the bumper cross-member (2). According to the invention, the entire or substantially the entire end face (5) of the energy-absorption component (3) is supported on the rear side of the bumper cross-member (2), and the plane of the end face (5) of the energy-absorption component (3) facing the bumper, and thus the bumper cross-member (2), is oriented such that the front side thereof is arranged at an angle to the plane extending orthogonally to the force application direction of the AZT structure test.

8 Claims, 4 Drawing Sheets

(56) References Cited

FOREIGN PATENT DOCUMENTS

| | | |
|---|---|---|
| DE | 102001014047 | 10/2005 |
| EP | 1160133 A2 | 12/2001 |
| EP | 1736369 A2 | 12/2006 |
| WO | 97/03865 A1 | 2/1997 |

OTHER PUBLICATIONS

Written Opinion for PCT/EP2012/064980—see entire document.
International Preliminary Report on Patentability (Chapter II_ for PCT/EP2012/064980—see entire document.

* cited by examiner

VEHICLE BUMPER ASSEMBLY

CROSS REFERENCE APPLICATIONS

This application is a National Stage application of PCT/EP2012/064980 filed Aug. 1, 2012 claiming the priority to German application no. 10 2011 052 770.2 filed Aug. 17, 2011 and to German application no. 20 2011 051 008.5 filed Aug. 17, 2011

BACKGROUND

The invention relates to a vehicle bumper assembly with a bumper cross member and at least two energy absorption components arranged at a distance from each other. The energy absorption components are connected to the rear side of the bumper cross member and each have a first end and with an effective absorption direction (x direction) aligned transversely to the longitudinal extension (y axis) of the bumper. The energy absorption components there are supported on the end facing away from the bumper on a chassis part of a vehicle.

Energy absorption components, so-called crash boxes, are arranged between the bumper and the chassis of a vehicle for absorbing kinetic energy that acts on the bumper of a vehicle in case of an accident, in particular in the low speed range. These energy absorption components are typically connected to the longitudinal vehicle carriers associated with the chassis. Energy absorption components of this type are manufactured from metal or a composite material. For example, they can be box-shaped components manufactured from steel sheeting. Aluminum extrusion profiles are also used These energy absorption components are folded together in the direction of their longitudinal axis like an accordion or a bellows for purposes of absorbing energy. The reforming process absorbs the impact energy. At the same time a delay of the impact into the vehicle chassis takes place due to the buckling process as these components are folded together in the previously described manner. In these vehicle bumper assemblies the planes of the front end face surfaces of the energy absorption component are arranged either according to the introduction of force of the AZT structural test, that is, at an angle of 10° to the y-z plane about the x axis, or in the direction of the y-z axis (ATZ: Alliance Center for Technology).

In order to initiate the folding process to absorb any energy, a force peak—a so-called initial peak—must be overcome. If the force peak with which a first reforming processes introduced is overcome, the folding process of the energy absorption component continues with an already distinctly less introduction of force. In the case of an energy absorption component made from an aluminum alloy the initial peak can be 30 to 40 percent above the level of the force necessary for allowing the folding process to continue. These energy absorption components are designed in such a manner as regards its energy absorption that the danger of a permanent deformation of the chassis part does not occur until the energy absorption component has been folded together to a block. This means that, the energy absorption component has lost its ability to function as an energy absorption component. For this reason, the level of the initial peak for starting the energy absorption of such a component must be below the force at which a permanent deformation of the chassis part begins or is to be feared for the part the energy absorption component or components are connected to. Thus, the possible absorption of energy in the design of such an energy absorption component is decisively determined by the level of the initial peak, that is, by the level of the force necessary for starting the energy absorption process.

In order to counter this disadvantage, energy absorption components of the cited type have been developed into which weak points were introduced, for example, by impressing given bending lines or folding lines or by introducing perforations. The level of the initial peak can be reduced with such measures but this requires additional, cost-intensive work steps. There is therefore the desire to further improve such energy absorption components as regards the addressed problem. Furthermore, it would be desirable if the length of such an energy absorption component can be held as small as possible.

WO 97/03865 A1 describes a bumper assembly in which the energy absorption component is manufactured as an extruded aluminum alloy component. The front surface of the energy absorption component is designed as a hollow chamber profile, with an oblique front surface facing the bumper cross member. The bumper cross member comprises a receptacle into which the oblique end of the energy absorption component is inserted. The oblique surface of the energy absorption component, which surface is supported by a punctual contact opposite the back side of the energy absorption component, is arranged at an angle, leaving an angular slot. In this previously known bumper assembly, there is the danger that the regulatory assembly between the bumper cross member and the energy absorption component changes relative to one another in the case of an impact. In addition, very precise care must be taken during the manufacture of the parts and of their assembly that in order to realize the punctual support the described slot between the front surface of the energy absorption component and the back side of the bumper cross member is present.

A side frame structure for vehicles is known from DE 196 35 285 A1. The side frame structure consists of two U-shaped half-shell segments. The side frame structure functions such that an airbag ignition takes place only upon a medium severe impact. To this end the front side of the side frame structures is beveled relative to its upper segment opposite the back side of the bumper cross member, and that the end of the lower segment in this regard is spaced offset from the oblique ends. The side of this side frame structure which side faces the bumper cross member is at a distance from the back side of the bumper cross member.

The foregoing example of the related art and limitations related therewith are intended to be illustrative and not exclusive. Other limitations of the related art will become apparent to those of skill in the art upon a reading of the specification and a study of the drawings.

SUMMARY

Starting from the vehicle bumper assembly known from WO 97/03865 A1, the invention therefore has the basic task of suggesting a vehicle bumper assembly with which the previously addressed disadvantages of this prior art are avoided.

In the disclosed a vehicle bumper assembly the main feature is that the energy to be adsorbed into the energy absorption component is introduced at the beginning of an energy absorption procedure only via a part of the cross-sectional surface into the energy absorption component. Namely, by a concentration of the force loading the energy absorption component in the case of an impact, acting on the bumper, on the front surface area of the energy absorption component provided of this purpose. Since this surface is only a fraction of the total cross-sectional surface of the energy absorption component, the force present is concentrated on this area and can then initiate an energy absorption process, which is limited at first on this partial cross-sectional area by beginning a folding procedure. To this end it is provided that the energy absorption component has an oblique front surface on the bumper side supported entirely or substantially entirely on the back side of a bumper cross member and is connected to the bumper cross member.

The disclosed energy absorption component can be connected to the bumper cross member by fasteners, rivets or the like or also by a joining process or an adhesive connection, unlike with the discussed prior art ones. Joining and adhesive connecting techniques are made possible in this vehicle bumper assembly due to the claimed support assembly of the energy absorption component and the bumper cross member. In addition, it is especially advantageous in the claimed bumper assembly that a connection of the oblique front surface of the energy absorption component to the rear side of the bumper cross member is readily possible. In this manner even the bumper cross member experiences a stable connection to the energy absorption component or components. It is not required in the subject matter of the claimed invention to observe special slot dimensions or angular positions. Furthermore, in the disclosed bumper assembly the geometry in the support between the bumper cross member and the energy absorption component remains constant.

In addition, it is provided in the claimed vehicle bumper assembly that the plane of the front surface, facing the bumper, of the energy absorption component and therewith the bumper cross member is arranged with its front side at an angle to the orthogonal plane running in the direction of the introduction of force of the AZT structure test. Indications that it could be advantageous to depart from the customary practice of arranging the bumper cross member as regards its vertical plane parallel to the barrier in accordance with the AZT structure test and to leave this practice cannot be gathered from the prior art.

Therefore, in the claimed vehicle bumper assembly not only is a formation of an initial peak is largely avoided, but additionally it can be produced with a slight expense for the working and mounting by an appropriate construction of the energy absorption component. That is, in particular of its material, its cross-sectional geometry and the measuring of the amount of the cross-sectional surface for a first introduction of force for starting the energy absorption process.

The especially positive influence on the avoiding or reducing of a force-related initial peak for initiating the energy absorption process is based in the claimed system assembly between the energy absorption component and the bumper cross member. Due to the oblique position of the bumper cross member with its vertical plane to the front side of the barrier, during the course of an energy absorption process when it has a sufficient stability the bumper cross member, is rotated toward the vehicle chassis about a horizontal transverse axis such that during the course of the progressing energy absorption process the bumper cross member only lies in a planar manner on the front side of the barrier when the force is introduced into the entire cross-sectional surface of the energy absorption component. The system assembly between the energy absorption component with it front surface facing the bumper cross member on the bumper cross member does not change here. For this reason the geometry of the introduction of force into the energy absorption component during an energy absorption process remains constant to a great extent. To this extent the bumper cross member retains the geometry of the introduction of force on a defined introduction of force into an energy absorption component by its spatial assembly and support. Furthermore, the previously described production process of the bumper cross member can be factored in as another magnitude into the designing of the energy absorption and in particular into the force necessary for reforming the energy absorption component.

If in the course of these comments a support of the energy absorption component with its front surface on the rear side of the bumper cross member is discussed, in which substantially the entire front surface of the energy absorption component is supported on the rear side of the bumper cross member, this means that areas or sections can absolutely be present in the support assembly in which the front surface does not rest on the rear side of the bumper cross member because in this area, stamped features such as ribs or stiffening corrugations, for example, are present in the bumper cross member. It is essential that a support assembly that is stable for the assembly is given between the two components.

Such an energy absorption component is typically manufactured from metal or a composite material.

An energy absorption component in accordance with the invention can be constructed to be shorter than one having perforations appropriate for weakening it by the previously described concentration of force with the same energy absorption capacity as a traditional energy absorption component.

The energy absorption components under discussion are typically box-shaped hollow chamber profiles. The force present on a chamber wall or also on an edge or an edge area can be concentrated as a function of the spatial position of the plane of the front surface of the energy absorption component.

If the energy absorption process has been initiated by starting a first beginning folding process, the cross-sectional surface of the energy absorption component loaded with the force becomes increasingly larger as the introduction of force continues as long as until the existing force is introduced into and over the entire cross-sectional surface of the energy absorption component in a distributed manner.

In the case of an angular alignment of the end plane of the energy absorption component on the bumper side, as previously described, an angular assembly of 1° to 8°, typically of 3° to 6° and in particular of 4° to the plane or to the impact plane of the AZT structure test lying orthogonally to the direction of the introduction of force is considered as sufficient. It is understood that the selection of this angle influences the length of the energy absorption component. For this reason this angle is selected to be as small as possible.

Other advantages and embodiments of the invention result from the following description of exemplary embodiments. In the figures:

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 1:
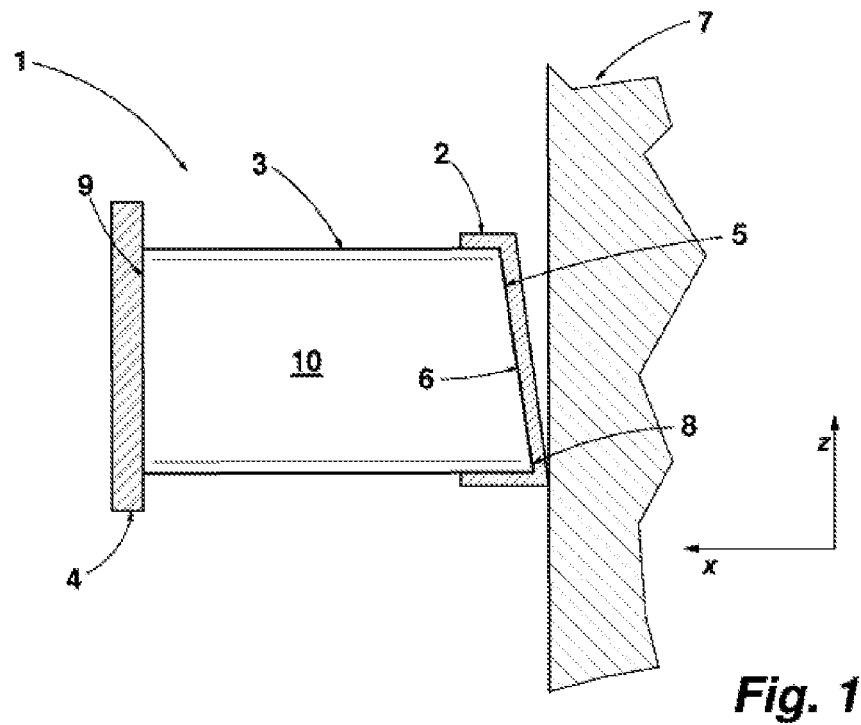
FIG. 1 is a schematic view of a vehicle bumper assembly in a cross-sectional view.

FIG. 1 shows a vehicle bumper assembly 1. FIG. 1 shows the bumper assembly 1 with a bumper cross member 2. The bumper cross member 2 is shown without an otherwise typical reinforcement profiling running in the transverse direction and thus forms the rear side of the bumper on which two energy absorption components 3 are arranged with spacing in the direction of the vehicle (x direction). Only one energy absorption component 3 can be seen in the cross-sectional view in FIG. 1. The representational plane of FIG. 1 is indicated with the customary coordinates. The energy absorption components 3 connect the bumper cross member 2 to the chassis of the vehicle. In the depicted embodiment the energy absorption components 3 are connected to a longitudinal carrier of the chassis. In FIG. 1 a connection plate 4 (base plate) for connection to the longitudinal carrier is connected to the energy absorption component 3.

The energy absorption component 3 of the depicted embodiment is a profile consisting of a metal of a material variant suitable for forming an energy absorption component—a so-called crash box—, a suitable aluminum alloy for example. The energy absorption component can be an extruded profile, or it can also be designed with several chambers. The energy absorption component 3 comprises a first front surface 5 that faces the bumper member 2 and is supported over its full area and therefore with its entire front surface 5 on the back side 6 of of the bumper 2. The energy absorption component 3 is connected mechanically to the bumper member 2 using fasteners in a manner not shown in detail.

In addition, a barrier 7 in accordance with the AZT structure test is shown. The bumper cross member 2 is shown with a partial area of its front side on the barrier 7 for representing an introduction of force into the energy absorption component 3 upon an impact. The view of FIG. 1 illustrates that the bumper cross member 2 is arranged with its z plane at an angle to the plane of the front side of the barrier 7. This is the consequence that the entire front surface 5 of the energy absorption component 3 is supported on the rear side of the bumper cross member 2. In the depicted embodiment, the angular arrangement between the front side of the bumper cross member 2 and between the front side, facing it, of the barrier 7 the angular arrangement is provided in such a manner that the lowest wall of the energy absorption component 10 is longer than the upper one. The angular arrangement of the bumper cross member to the front side of the barrier can also be achieved in that the upper wall of the energy absorption component is longer than the lower one.

It is a particularity of the energy absorption component 3 that the force of the impact is introduced into the energy absorption component 3 (on its front surface 5) at the beginning of an absorption of impact energy only in areas—in the exemplary embodiment shown on its lower edge running in the y direction. The rear front surface 9 of the energy absorption component 3 is supported on the chassis side on the connection plate 4. The connection plate 4 is fastened on the longitudinal carrier in a manner not shown in detail. The connecting of the energy absorption component 3 to the connection plate 4 is not shown in the figures.

Figure 2:
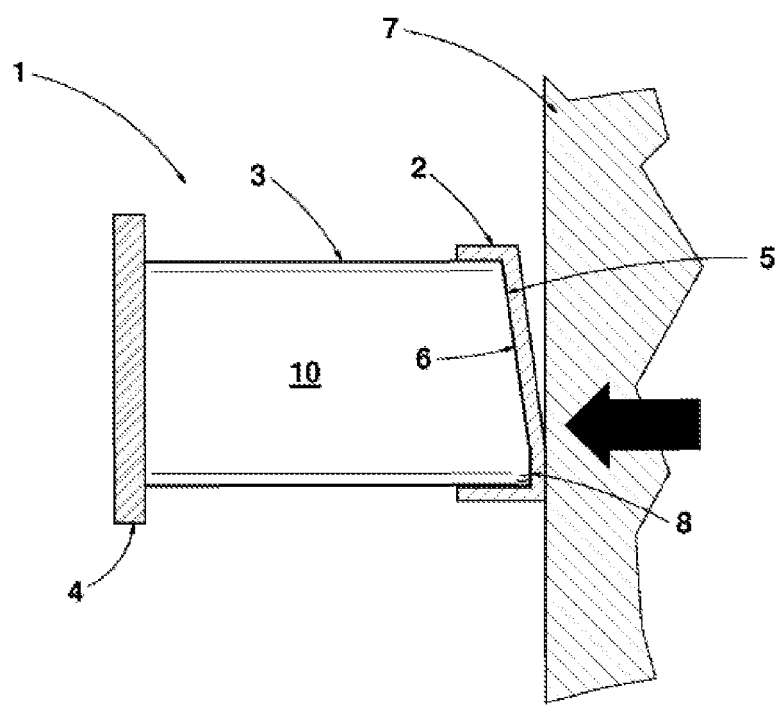
FIG. 2 is the assembly of FIG. 1 at the beginning of an introduction of force.

As a result of the only area-wise introduction of impact energy into the energy absorption component 3, upon an impact—represented by the block arrow in FIG. 2—in a first phase of the introduction of the impact energy, the force acting on the energy absorption component 3 is concentrated on its lower wall 8 in FIG. 2. Therefore, at first only the wall 8 and also the bordering areas are subjected to a deformation, before the other wall sections are involved with the energy absorption process. With increasing introduction of force into the energy absorption component 3, the impact energy is introduced into the entire cross-sectional surface of the energy absorption component 3. The introduction of force, that is selective at the beginning of an energy absorption procedure, is supported by the at least very largely full-surface contact of the inclined front surface 5 of the energy absorption component on the rear side 6 of the bumper cross member 2. As a result, a geometry of force introduction is ensured that is uniform, or at least approximately uniform. The energy absorption component 3 folds together like a bellows as a consequence of the absorption of energy. In FIG. 2 the beginning of an energy absorption can be recognized by the formation of folds in the area of the wall 8. As a consequence of the concentration of force on the front surface of wall 8, the folding process and therewith the absorption of energy can be initiated without an appreciable initial peak having to be overcome. Rather, the energy absorption component 3 is designed in such a manner that the force necessary for carrying out the reforming procedure remains very largely the same over the longitudinal extension of the energy absorption component 3. As a result, it is possible to design the energy absorption component 3 in such a manner that the force necessary for the energy absorption can be so great over the entire length of the energy absorption component 3 that the load level of the longitudinal carrier is not exceeded.

Figure 3:
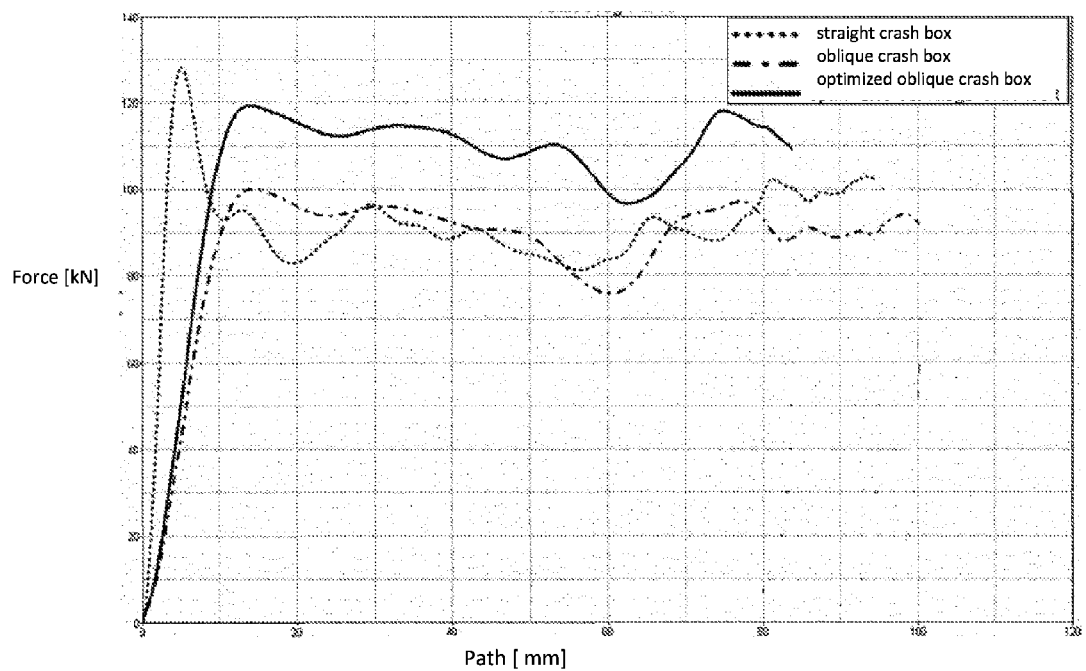
FIG. 3 is a force path diagram representing the force required for the deformation of energy absorption components.

FIG. 3 shows three force path curves in a comparison, whereby the one of the previously described exemplary embodiment is the curve with a solid line. The load level of the longitudinal carrier is approximately 130 kN in this example. The energy absorption procedure begins for the energy absorption component 3 at approximately 120 kN and remains, as is apparent from FIG. 3, below this value and at a largely uniform level of force.

The force path curve of the energy absorption component 3 is compared in FIG. 3 to an appropriate curve of a traditional energy absorption component (dotted line). This traditional energy absorption component has the same construction as the energy absorption component 3 with the exception of the design of the oblique front surface 5. The comparison makes it clear that the level of energy absorption for this traditional energy absorption component, after the initial peak has been overcome, is clearly below that of the optimized energy absorption component 3. As a result of the tilted front surface, the initial pulse almost disappears and given the same maximum force on the longitudinal carrier, the general load level of the energy absorption component 3 can be reduced by a thickening of the wall thickness. This results in the further advantage of the energy absorption component 3 that it can be designed to be shorter for absorbing the same energy. This allows advantages in the designing of the entire vehicle. This advantage can also be utilized in a non-necessary or desired shortening of the energy absorption component in that the wall thicknesses of the energy absorption component can be reduced in comparison to traditional ones. The necessary use of material is also correspondingly lower. Another energy absorption component in accordance with the claimed invention is sketched in the diagram of FIG. 3 in dots and dashes. It is not optimized as regards its energy absorption capacity. Therefore, the energy absorption curve runs approximately at the level of the curve of the traditional energy absorption component after its initial peak has been overcome. It is also clearly recognizable in this curve that no, at least no appreciable initial peak is present. In the case of the energy absorption component 3, that is designated in the diagram as an optimized, oblique crash box, the wall thicknesses are designed somewhat thicker for optimizing the capacity for energy absorption in order to obtain the high energy absorption level shown over the entire length of the energy absorption component in the x direction.

Figure 4:
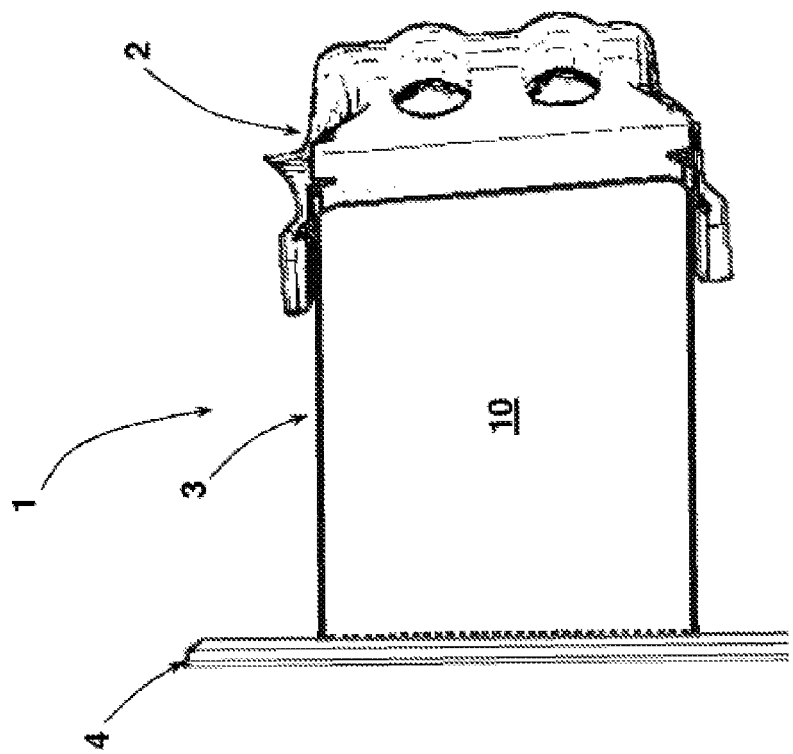
FIG. 4 shows a schematic perspective view of the bumper assembly of FIG. 2.

FIG. 4 shows the energy absorption component 3 in a schematic, perspective view with an indication of the start of the formation of folds, recognizable on the side wall 10 bordering the wall 8. The fold formation is shown only schematically and should explain that a fold formation begins in the wall 8, and in the side walls 10, that border it, of the energy absorption component 3. The fold formation or the reforming process continues in the x direction—the longitudinal direction of the energy absorption component 3—and successively incorporates a cross-sectional part of the energy absorption component 3 that becomes greater as the introduction of force continues until the entire cross-sectional surface is incorporated into the energy absorption procedure.

Figure 4A:
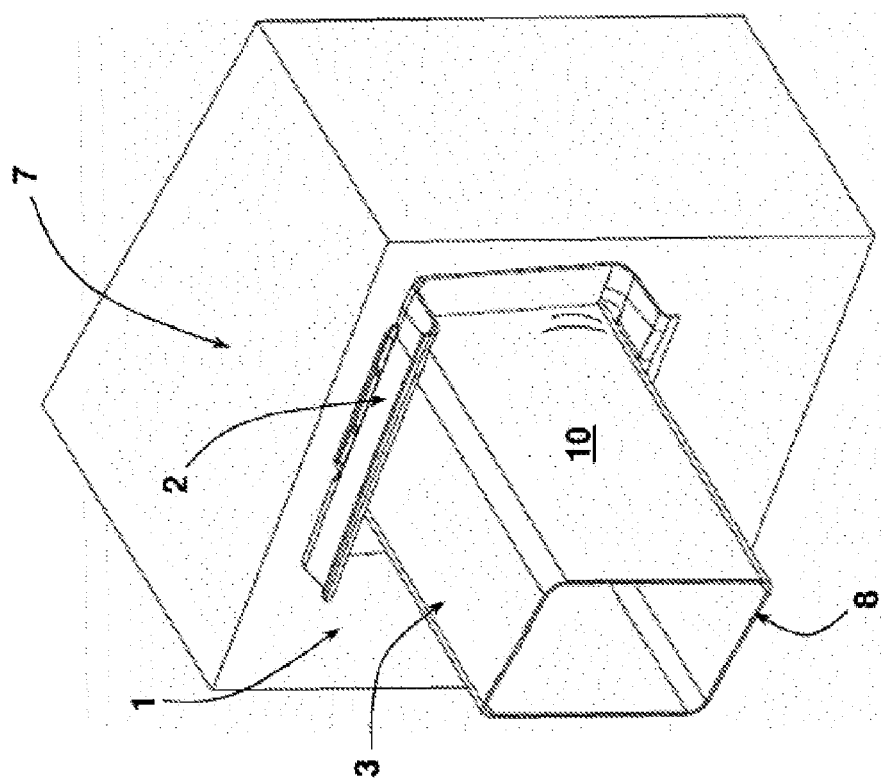
FIG. 4a shows a side view of the bumper assembly of FIG. 1 that is closer to reality.

FIG. 4 shows that the energy absorption component 3 of the represented exemplary embodiment is a single-chamber hollow chamber profile. It is understood that the design of the energy absorption component 3 shown is exemplary and that it can also be constructed with multiple chambers. FIG. 4a shows the bumper assembly 1 with the energy absorption component 3 connected to the bumper cross member 2 in a view closer to reality.

Figure 5:
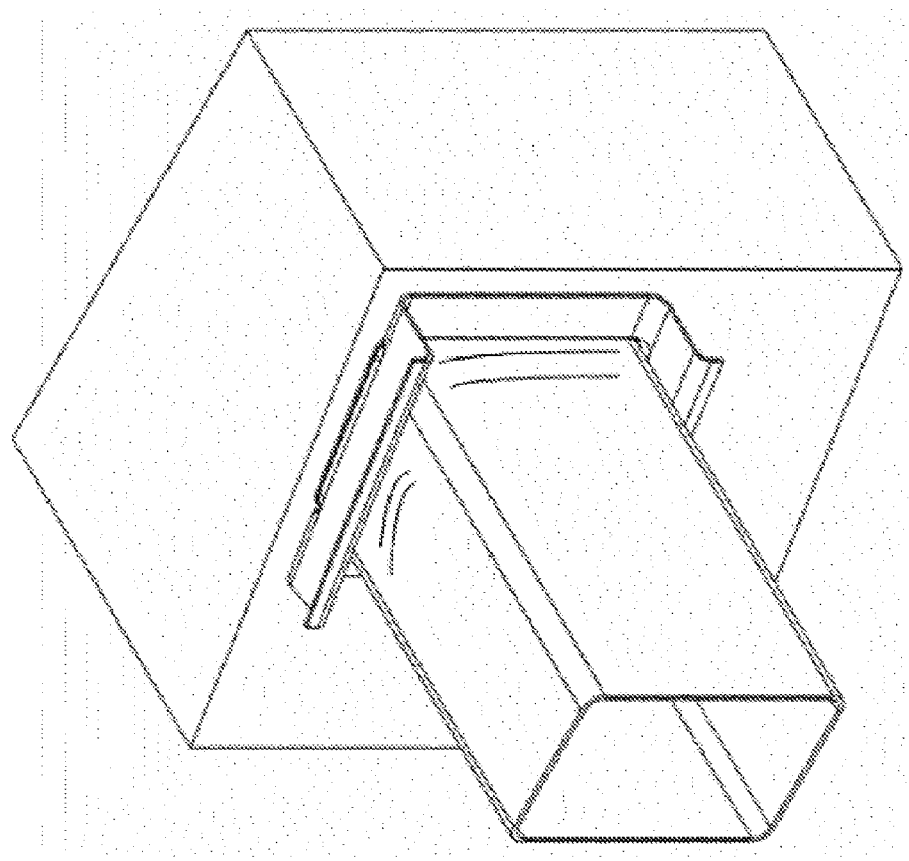
FIG. 5 shows a schematic view corresponding to those of FIGS. 3 and 4 representing the beginning of an energy absorption process in a bumper assembly in accordance with a state of the art.

FIG. 5 shows, by way of comparison with the previously described exemplary embodiments of the claimed invention, a prior art vehicle bumper assembly in accordance with the state of the art in which the introduction of the impact energy is introduced into the energy absorption component from the beginning by the entire front surface of the energy absorption component. As was already described concerning the state of the art, the energy absorption process (beginning of the fold formation) does not begin until after a high initial force peak is as indicated in FIG. 3 by the dotted curve shown.

The invention was described using exemplary embodiments. The invention can also be carried out in another manner, which other embodiments readily result for a person skilled in the art without leaving the scope of the current claims. Thus, for example, it is possible in principle to also associate the described mechanisms with the front surface of the particular energy absorption component, which front surface faces the longitudinal carrier.

LIST OF REFERENCE NUMERALS 1 vehicle bumper assembly
2 bumper cross member
3 energy absorption component
4 connection plate (base plate)
5 front surface
6 rear surface
7 barrier
8 wall
9 front surface
10 side wall

The invention claimed is:

1. A vehicle bumper assembly comprising:
a bumper cross member;
at least two energy absorption components arranged at a distance from each other;
said at least two energy absorption components connected to a rear side of the bumper cross member and supported on the bumper cross member on a first end and with an effective absorption direction (x direction) aligned transversely to the longitudinal extension (y axis) of the bumper;
said at least two energy absorption components having an end facing away from the bumper cross member for attaching on a chassis part of a vehicle;
the at least two energy absorption components having an oblique front surface in the direction of the bumper cross member;
substantially the entire oblique front surface of the energy absorption component faces the bumper cross member and is directly attached to a rear side of the bumper cross member; and
a plane of the oblique front surface of the energy absorption component and the bumper cross member is arranged with its front side at an angle to an orthogonal plane running in the direction of an introduction of force of an AZT (Allianz Zentrum für Technik) structure test.

2. The vehicle bumper assembly according to claim 1, wherein the front side of the bumper cross member and the orthogonal plane running in the direction of the introduction of force of the AZT structure test enclose an angle opening upward or downward in the vertical direction.

3. The vehicle bumper assembly according to claim 2 wherein the vectors defining the plane of the front surface of the at least two energy absorption components do not run parallel to the z direction and/or to the y direction.

4. The vehicle bumper assembly according to claim 1, wherein a vectors defining the plane of the front surface of the at least two energy absorption components do not run parallel to the z direction and/or to the y direction.

5. The vehicle bumper assembly according to claim 4, wherein the plane of the front surface of the bumper cross member is inclined by 1° to 8° to the plane orthogonal to the direction of the introduction of force.

6. The vehicle bumper assembly according to claim 5, wherein the plane of the front surface of the bumper cross member is at an incline of approximately 4° to the plane orthogonal to the direction of the introduction of force.

7. The vehicle bumper assembly according to claim 4, wherein the plane of the front surface of the bumper cross member at an incline of between 1° to 8° to the plane orthogonal to the direction of the introduction of force.

8. The vehicle bumper assembly according to claim 7, wherein the plane of the front surface of the bumper cross member is at an incline of approximately 4° to the plane orthogonal to the direction of the introduction of force.

* * * * *